United States Patent [19]

Shiomi et al.

[11] 4,111,630

[45] Sep. 5, 1978

[54] MULTI-CORE ROTARY CIRCULAR DIE

[75] Inventors: Kozen Shiomi; Ryoichi Shimizu, both of Yokohama, Japan

[73] Assignees: Toyo Soda Manufacturing Co., Ltd.; The Japan Steel Works Limited, Tokyo, both of Japan

[21] Appl. No.: 695,048

[22] Filed: Jun. 11, 1976

[30] Foreign Application Priority Data

Jun. 13, 1975 [JP] Japan ................. 50-70946

[51] Int. Cl.² .......................................... B29D 23/04
[52] U.S. Cl. ......................... 425/462; 264/209; 264/241; 425/133.1; 425/376 B; 425/466; 425/467
[58] Field of Search ............... 425/72 R, 466, 467, 425/380, 381, 376 B, 133.1, 133.5, 113, 462; 264/209, 241, 245

[56] References Cited

U.S. PATENT DOCUMENTS

| 3,546,743 | 12/1970 | Roth .......................... 425/133.1 |
| 3,649,143 | 3/1972 | Papesh et al. ............... 425/133.1 X |
| 3,802,826 | 4/1974 | St. Eve ......................... 425/467 X |
| 3,856,448 | 12/1974 | Iijima et al. .................. 425/133.1 |
| 3,947,172 | 3/1976 | Myers .......................... 425/113 |

Primary Examiner—Francis S. Husar
Assistant Examiner—Mark Rosenbaum
Attorney, Agent, or Firm—Oblon, Fisher, Spivak, McClelland & Maier

[57] ABSTRACT

A multi-core rotary circular die for preparing multi-layer tubular film comprises an inner core which is rotatably fitted in a hollow cylindrical body having a plurality of molten resin inlets and a plurality of middle cores having semi-spherical or spherical surfaces are fitted on the inner core adjacent the one end thereof. The middle cores form the molten resin passages for adjusting the thickness of the molten resin films. The inner core has annular resin storage channels on the periphery thereof and internal resin passages therein connected to the corresponding annular resin storage channels, which are respectively connected to the corresponding molten resin inlets, and an utility feeding passage is also formed in the inner core extending in the longitudinal direction thereof.

13 Claims, 5 Drawing Figures

MULTI-CORE ROTARY CIRCULAR DIE

BACKGROUND OF THE INVENTION

1. Field of the Invention

The present invention relates to an improved multi-core rotary circular die of the type designed for producing multi-layer tubular film.

2. Description of the Prior Art

Heretofore, circular dies of various constructions have been proposed, such as, for example, multi-core rotary circular dies which are composed of a body having a plurality of inlets for molten resins, an inner core having resin feeding passages formed by a plurality of pipes communicating with the resin inlets, cores having spherical seal type resin passages connected to the resin feeding pipes and cylindrical parts on spherical parts of the multiple cores which are fitted at the spherical parts to each other, whereby lips are formed, to offer adjustable thickness between the cylindrical parts.

However, in the conventional technology, where a plurality of pipes are formed in the inner core by a screwIng manner or the like, the following disadvantages have been found:

an inner size of the molten resin passage is large; the molten resin adheres on the outer and inner surfaces of the pipes of the molten resin passage to cause residence of the resin; it takes a long time for disassembly and cleaning; and the utilities of air for inflation and water for cooling a molten resin film can be fed by connecting rotatable joints at the end of the rotary shaft.

However, it has been relatively difficult to feed electric power through a slip ring to the rotatable part, as it is difficult to provide continuous rotation of the die without the slip ring and it is necessary to provide a reciprocating turn, whereby the equipment and the operation are complicated.

SUMMARY OF THE INVENTION

It is an object of the present invention to overcome the disadvantages of the conventional processes, to improve them, and to provide a multi-core rotary circular die which can be easily assembled and disassembled and cleaned.

It is another object of the present invention to provide an improved multi-core rotary circular die which is compact and provides a balanced propulsive force.

It is a further object of the present invention to provide a multi-core rotary circular die which comprises a plurality of cores of improved structure which are fitted on an inner core and are adjustable so as to adjust the thicknesses of the molten resin films being extruded and to prepare a multilayer film which can be finely wound.

These objects of the present invention have been attained by providing a multi-core rotary circular die which comprises an inner core which is rotatably fitted in a hollow cylindrical body having a plurality of molten resin inlets, and a plurality of cores having semi-spherical or spherical surfaces which are fitted on the inner core to form molten resin passages adjustable to vary the thicknesses of the molten resin films being extruded, wherein the inner core has annular resin storage channels on the periphery thereof and resin passages therein connected to the corresponding annular resin storage channels, which are respectively connected to the corresponding molten resin inlets, and one or more utility feeding passages are formed in the inner core extending in the longitudinal direction thereof.

BRIEF DESCRIPTION OF THE DRAWINGS

Various other objects, features, and attendant advantages of the present invention will be more fully appreciated as the same becomes better understood from the following detailed description when considered in connection with the accompanying drawings, wherein like reference numerals designate like or corresponding parts throughout the several views and in which.

DETAILED DESCRIPTION OF THE PREFERRED EMBODIMENTS

As a result of various studies and experiments, annular or resin type resin storage channels and resin passages which are connected to corresponding molten resin inlets in a surrounding cylindrical body are formed in the inner core in the present invention. It has been found that when a stationary molten resin inlet is substantially faced to a molten resin passage of an annular or ring design, the pressure of the molten resin is low, and the pressure of the molten resin becomes maximum when the position of the resin passage is shifted 180 degrees, and that the pressure of the molten resin highly affects the flow rate of the extruded molten resin. In order to overcome the problem, the outer diameter of the inner core is minimized considering the size of the annular resin storage channels or the resin passages. As a result, the fluctuation of the flow rate of the extruded molten resin can be minimized to $\pm 1$ to 2%.

According to the present invention, a desired number of utility feeding passages are formed in the inner core in a longitudinal direction thereof. In one utility feeding passage, electric wire for the heater of the circular die is disposed so as to feed electric power through a slip ring to the heater. When a slip ring is not used, the circular die cannot be continuously rotated, but it must be reciprocally turned, whereby the structure and the operation have been complicated.

In the circular die of the present invention, the electric wire is disposed in one of the utility feeding passages whereby electric power can be easily fed through the slip ring and the circular die can be continuously and smoothly rotated in one direction.

The cores used in the two embodiments of the present invention described herein have, respectively, a semi-spherical surface or a spherical surface. A structure having spherical surfaces is known to have a high degree of freedom in the design of passages in a circular die, but the preparation, assembly and disassembly of such a circular die are not easy and require a long time. The molten resins used for the circular die include low density polyethylene, high density polyethylene, ethylene vinylacetate copolymer, polypropylene, ionomer, nylon 6 and the like. For example, a multi-layer film is preferably formed with low density polyethylene for an inner layer, ionomer for the middle layer and nylon 6 for the outer layer.

Figure 1:
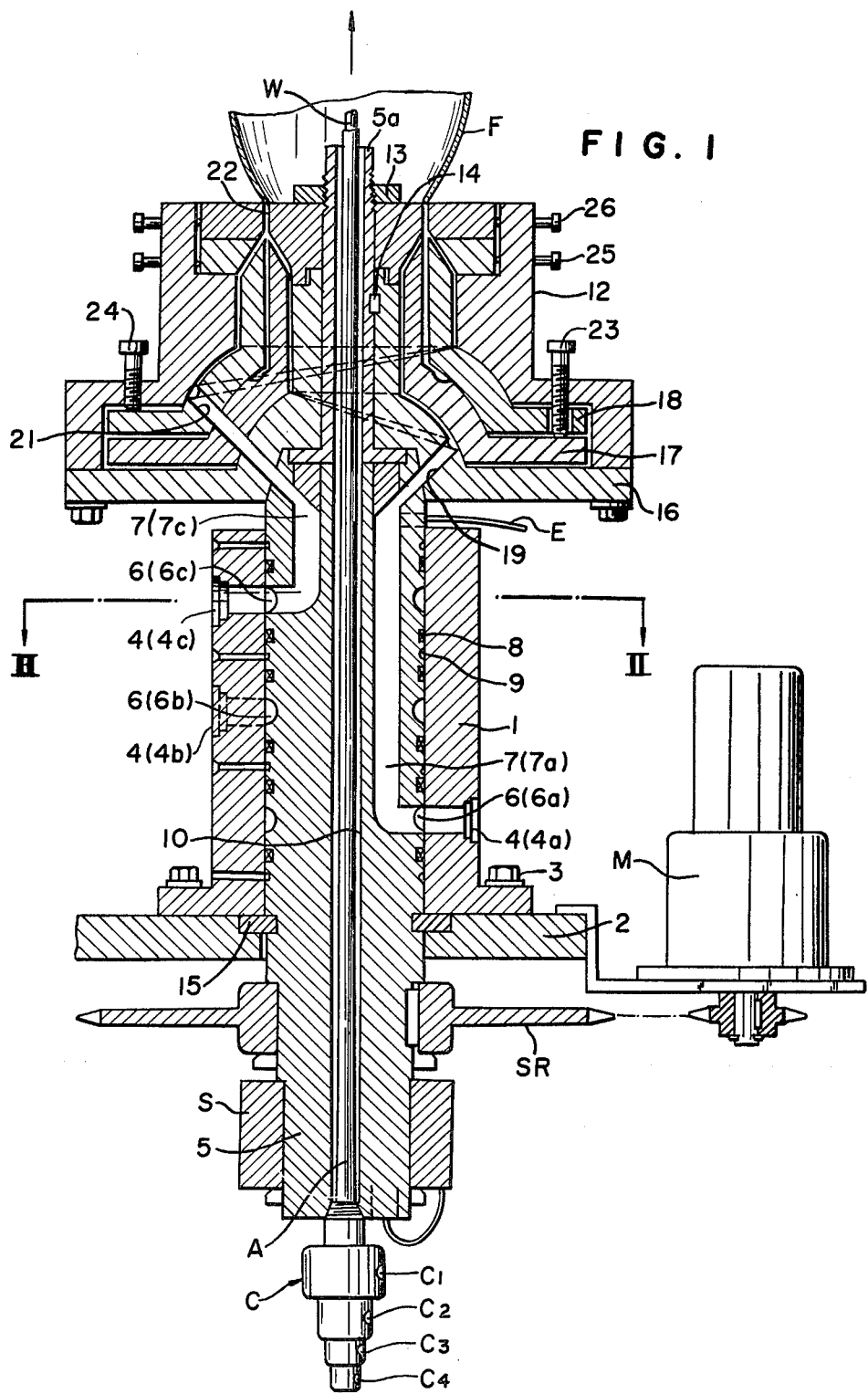
FIG. 1 is a sectional view of one embodiment of a multi-core rotary circular die according to the present invention.
Figure 2:
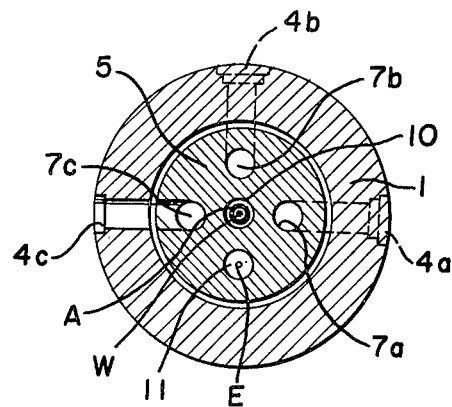
FIG. 2 is a sectional view taken along the line II—II of FIG. 1.

Referring now to FIGS. 1 and 2, a multi-core rotary circular die which includes a middle core having an outer semi-spherical surface and disposed on an inner core, will be illustrated. A hollow cylindrical body 1 made of metal or the like is fixed on a table 2, made of metal or the like, by fastening means 3, such as bolts. Three molten resin inlets 4a, 4b and 4c are formed through the wall of the hollow cylindrical body 1 at suitable positions on the outer surface thereof. An inner core 5, made of metal or the like, is rotatably fitted in the hollow cylindrical body 1 and includes a utility feeding passage 10 extending longitudinally and passing through the axial center of the inner core. The inner core 5 has ring type or annular resin storage channels 6a, 6b and 6c and internal longitudinally extending resin passages 7a, 7b and 7c, which are respectively connected to the corresponding molten resin inlets 4a, 4b and 4c.

A cooling water pipe W for cooling the multi-layer molten resin film and an air pipe A for inflating the multi-layer molten resin film, which are connected to a multi-layer circular die 12, are disposed inside of the utility feeding passage 10. Suitable circular seals 8, as O-rings, are disposed between the hollow cylindrical body 1 and the inner core 5, between the annular storage channels, so as to prevent contamination of the molten resins. Molten resin leakage grooves 9 are disposed between the hollow cylindrical body 1 and the inner core 5 and between respective pairs of seals 8 disposed between such resin storage channels.

Another utility feeding passage 11, which is similar to the utility feeding passage 10, is formed in parallel relation to the axial utility feeding passage 10 in the inner core extending in the longitudinal direction thereof.

An electric wire E is disposed in this other utility feeding passage 11 and electric power is fed through a slip ring S so as to continuously and smoothly rotate the circular die in one direction.

The multi-core circular die 12 is fastened on one end of the inner core 5 by a nut 13. Middle cores 16, 17 and 18, having semi-spherical surfaces are disposed in the circular die 12, and molten resin passages 19 and 21, and one other, not shown, are connected to the spaces between the cores.

A die lip 22 is connected to the spaces. A key 14 is disposed between the upper part 5a of the inner core 5 and the lower middle core 16 to rotate the multi-core circular die 12 with the inner core 5. A bearing 15 is disposed between the table 2 and the inner core 5 to hold the inner core 5. A motor M, a sprocket SR, a rotary joint C having four necks, a slip ring S, and an electric wire E are also provided.

An inlet $C_1$ for feeding air to the upper part of the mandrel is provided in the larger of the four necks of the rotary joint, a water outlet $C_2$ is provided in the next smallest neck, an outlet $C_3$ for discharging from the mandril is provided in the third neck and a water inlet $C_4$ is provided at the rotary joint C.

The rotary part R of the device thus includes the inner core 5, the multi-core circular die 12, the middle cores 16, 17 and 18, the die lip 22 and the slip ring S, while the stationary part ST includes the hollow cylindrical body 1 and the table 2.

Figure 4:
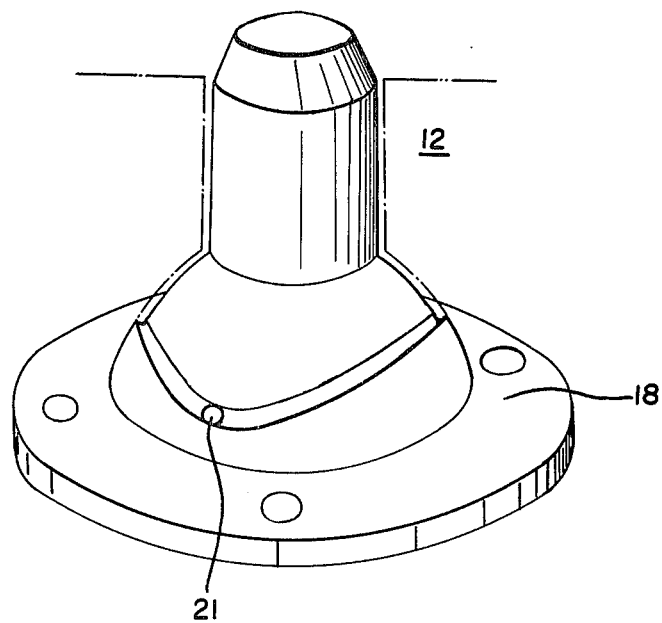
FIG. 4 is a schematic view of a semi-spherical part of one core.
Figure 3:
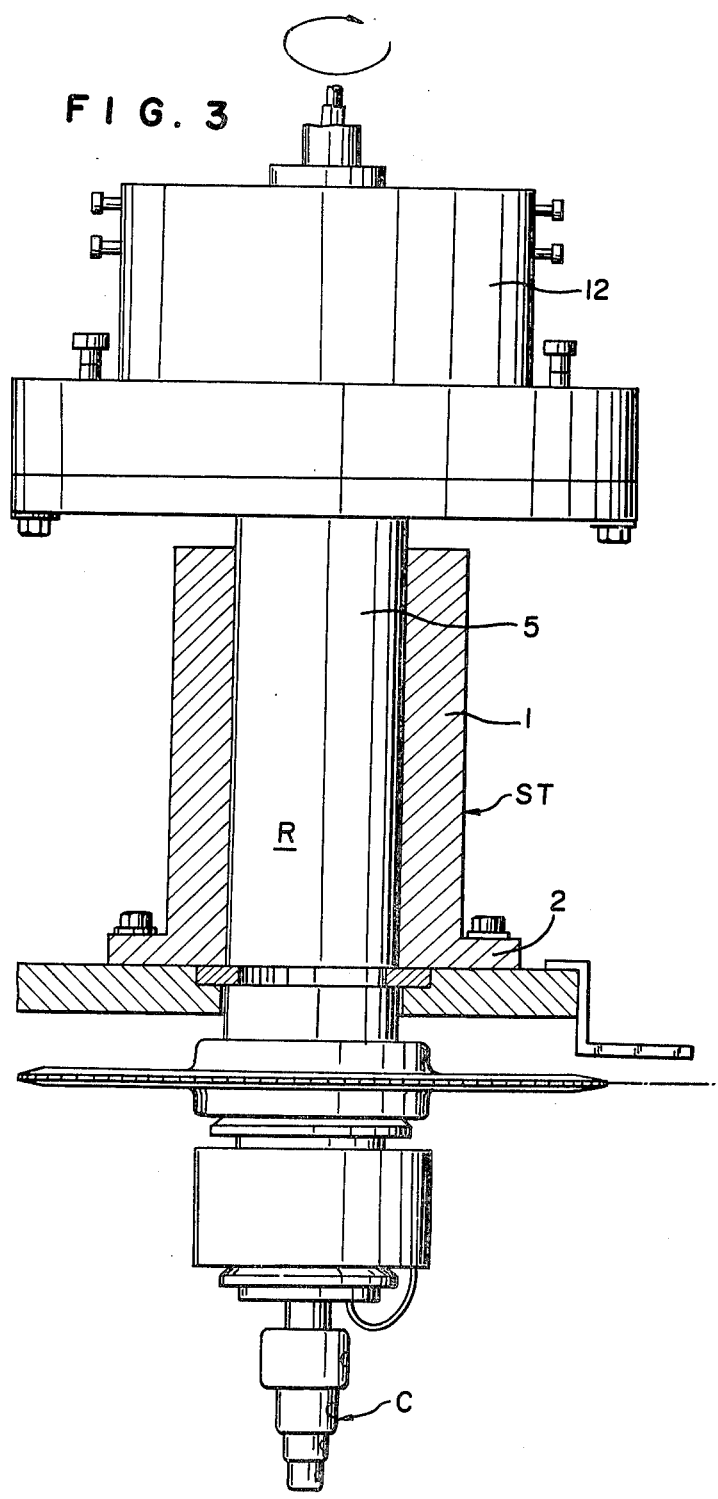
FIG. 3 is a schematic side view of the multi-core rotary circular die of FIG. 1 showing the rotary part R and the stationary part ST.

FIG. 4 shows the semi-spherical surface of the middle core 18, wherein the resin passage 21 is communicated with the space between the semi-spherical surface and the circular die 12. Also, as shown, a groove manifold is formed from the lower part of the semi-spherical surface to the opposite upper part of the semi-spherical surface, the width of the groove gradually decreasing from the lower part to the upper part of the spherical surface, as shown also by the dotted lines in FIG. 1. The slant angle of the groove manifold depends upon the size of the semi-spherical surface. The depth of the groove can be constant and also can be decreased from the lower part to the upper part of the spherical surface.

The space between the inner spherical surface of the core 18 and the outer spherical surface of the adjacent middle core 17 can be constant and can also be decreased from the lower part to the upper part, and is, for example, 0.1 to 5 mm, preferably 0.2 to 2 mm, and especially 0.5 to 1.5 mm. The space at the semi-spherical surface and the groove can be selected so as to provide uniform flow rate around the die lip 22. The slant tapered groove as the manifold on the semi-spherical surface is remarkably effective for attaining the uniform flow rate. If desired, the slant tapered groove can be formed on the inner semi-spherical surface of the circular die 12 instead of the outer semi-spherical surface of the middle core. The same type of slant tapered groove can be formed for each of the spaces connected to the resin passages, such being shown by dotted lines in FIG. 1.

Adjustment of the space at the semi-spherical surface and the cylindrical surface to the die lip can be attained by screwing the bolts 23, 24, 25 and 26, shown in FIG. 1.

The resin passages 19, 21 and the third such, not shown, are respectively connected to the ring type resin storages 6a, 6c, 6b, which can be grooves carved on the outer surface of the rotatable inner core 5, as shown in FIG. 1 or on the inner surface of the stationary hollow cylindrical body 1. Likewise, the seals 8 for preventing leakage of the molten resin from the annular resin storage channels can be fitted on the outer surface of the rotatable inner core 5 or on the inner surface of the stationary hollow cylindrical body 1.

It is a novel feature of the invention to form the passages from the annular resin storage channels 6a, 6b and 6c through the resin passages 19, 21 and other, not shown, to the slant tapered grooves in the semi-spherical parts. It is also a novel feature of the invention to form the middle cores with a semi-spherical portion and a cylindrical portion. The middle cores can be easily disassembled and the spaces between the middle cores and the circular die are finely adjustable and the slant tapered grooves on the semi-spherical parts improve the uniform flow rates of the molten resins.

Figure 5:
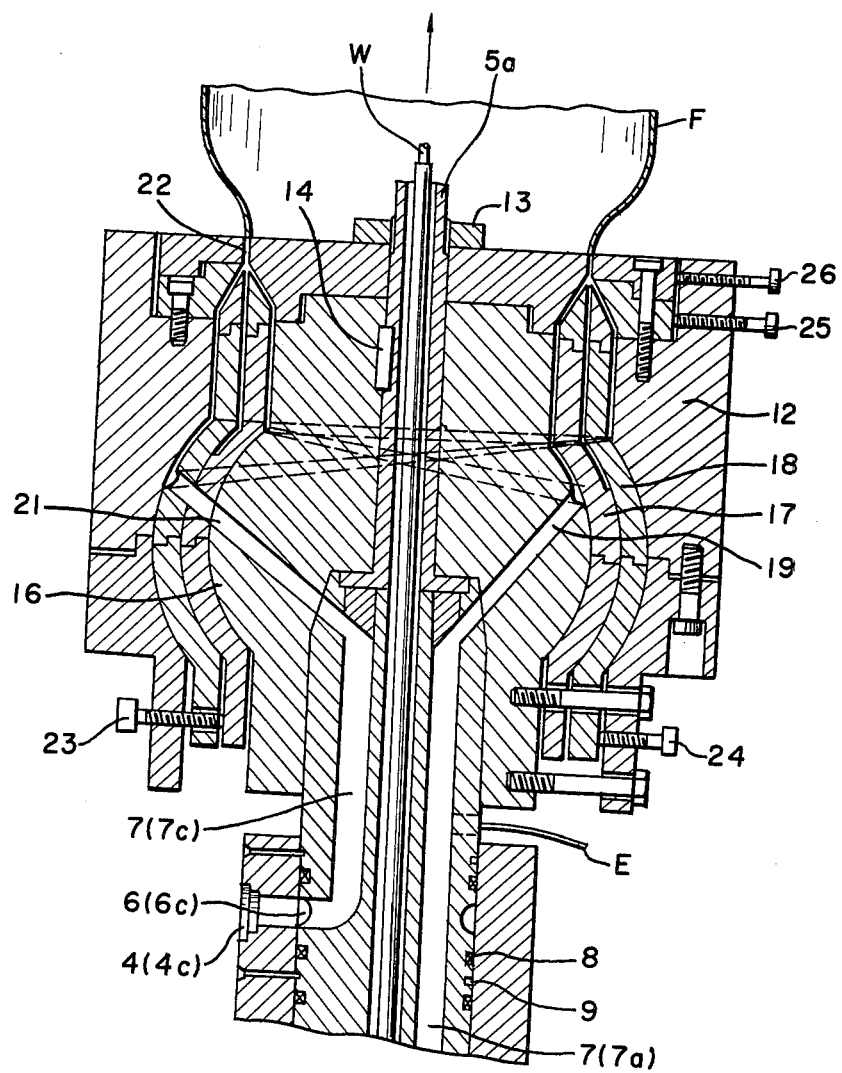
FIG. 5 is a sectional view of another embodiment of a multi-core rotary circular die also formed according to the present invention.

Referring now to FIG. 5, another embodiment of the multi-core rotary circular die of the present invention is illustrated, wherein molten resin inlets 4 are similarly formed through the wall of a hollow cylindrical body 1 and an inner core 5 is rotatably fitted in the hollow cylindrical body 1, but spherical middle cores 16, 17 and 18 are provided at the upper part. The inner core 5 has the annular resin storage channels 6 and the resin passages 7 which are respectively connected to the corresponding molten resin inlets 4. Thus, the parts of the hollow cylindrical body 1 and the inner core 5 are substantially the same as those of the embodiment shown in FIG. 1, with the exception essentially of the middle cores 16, 17 and 18 having spherical surfaces instead of semi-spherical surfaces. The middle core 17 can be of a separatable form so as to contact on the spherical surface of the middle core 16. The middle core 18 and the circular die 12 are also separatable so as to contact on the spherical surfaces thereof At the lower part of the spherical surface, the middle cores 16, 17 and 18 and the circular die 12 are rotatably fitted so as to adjust the spaces between the upper spherical surfaces of the middle cores and the circular die by the adjusting bolts 23 and 24.

The annular resin storage channels 6a, 6b and 6c are connected through the resin passages 7a, 7b and 7c and the resin passages 19, 21 and the one, not shown, and the spaces between the upper spherical surfaces to the die lip 22. The die lip 22 is formed with separatable parts which are held in the circular die 12. The thickness of the molten resin film can be adjusted by the adjusting bolts 23 and 24, and by bolts 25 and 26 for holding the die lip 22. The spaces between the middle cores and the circular die can be the same as those of the semi-spherical form, and are formed on the upper spherical parts, and can be constant and can also be decreased from the largest diameter part to the upper part. Each of the manifold of grooves can be formed as slant tapered grooves, which can be the same as those in the middle cores of the semi-spherical form. The shape of the slant tapered groove can be decided so as to attain a uniform flow rate. It is preferable, however, to form the slant tapered grooves as shown by the dotted lines in FIG. 5.

The electric wire E of a band heater for heating the die, not shown, the nut 13 for fastening the inner core 5, the holder 14 for connecting the inner core to the middle core 16, and the other parts are substantially the same as those of FIG. 1, except for the spherical inner cores 16, 17 and 18 and the circular die 12 having an inner spherical surface.

The operation of the multi-core rotary circular die of the invention will be illustrated. For example, low density polyethylene is fed from the molten resin inlet 4a through the ring type resin storage 6a and the resin passage 7a, which are formed in the rotated inner core 5, to the resin passage 19 for the inner layer of space between the middle cores 16 and 17 of the three layer circular die 12. Ionomer resin and nylon 6 are respectively fed from the molten resin inlets 4b and 4c through the resin passages 7b and 7c to the resin passage for the middle layer and the resin passage 21 for the outer layer of the middle cores 17 and 18 of the three layer circular die 12. The molten resin film for the three layer tube can be extruded from the die lip 22 and the thickness of the molten resin film can be adjusted by the adjusting bolts 23, 24, 25 and 26.

Thus, in the multi-core rotary circular die of the present invention, a plurality of annular or ring type resin storage channels connected to respective longitudinally oriented resin passages are formed in the inner core, and a desired number of utility feeding passages are also formed passing axially through the inner core. Accordingly, a compact apparatus can be prepared and the assembly, disassembly and cleaning of the circular die are easily accomplished. The circular die can be continuously and smoothly rotated in one direction and the operational efficiency can be improved because electric power is fed through a slip ring connected to an electric wire disposed in one of the utility feeding passages.

According to the invention, when the type of molten resin is to be changed, in order to attain a complete exchange of the molten resin, the outer diameter of the inner core 5 has been minimized and the resin storage channels 6a, 6b and 6c are formed by plating hard chromium or the like to provide smooth flow in the resin exchange. On the other hand, the molten resin may be easily retained by inserting plugs in the hollow cylindrical body in the positions facing the molten resin inlets 4a, 4b and 4c, and the plugs are taken out for the resin exchange operation and the molten resin is extruded from the opening, whereby the resin exchange can be attained for a short time.

In one example of the operation of the apparatus of the invention, excellent three layer resin film F was obtained by extruding low density polyethylene as an inner layer, ionomer resin as the middle layer and nylon 6 as the outer layer through a multi-core rotary circular die having a hollow cylindrical body with an outer diameter of 300 mm and an inner diameter of 200 mm, an inner core having an outer diameter of 200 mm and a rotary speed for the rotary part R of 1 turn per 10 to 15 minutes. In the above-mentioned embodiment, a plurality of cores having semi-spherical surfaces as shown and illustrated were employed. However, it is clearly understood that a person skilled in the art could apply the same structure, using a plurality of cores having spherical surfaces, as already described.

Obviously many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. In a multi-core rotary circular die for preparing multi-layer tubular film comprising an elongate inner core which is rotatably fitted in an elongate hollow cylindrical body and a plurality of middle cores having at least semi-spherical surfaces affixed to one end of the inner core which are fitted in a circular die, the improvement comprising:
    said hollow cylindrical body having molten resin inlets formed radially therein and formed at vertically separated positions;
    said inner core having annular resin storage channels therein and communicating with said inlets of said hollow cylindrical body;
    said inner core further having longitudinally extending resin passages which correspond to each of the annular storage channels to form corresponding layers of the multi-layer tubular film;
    said at least semi-spherical surfaces of said middle cores being connected to a die lip of said die;
    said middle cores being adjustably fitted on said one end of said inner core and in the circular die with at least part of the at least semi-spherical surfaces being in contacting relation; and
    a slant tapered groove formed on one of the at least semi-spherical surfaces of each of said middle cores, the inner core and the circular die wherein the slant tapered groove is disposed in a plane forming an angle with respect to the longitudinal axis of said inner core.

2. A multi-core rotary circular die according to claim 1 wherein the width of said slant tapered groove is gradually decreased from a lower part to an upper part of said at least semi-spherical surfaces.

3. A multi-core rotary circular die according to claim 2 wherein the depth of said slant tapered groove is constant.

4. A multi-core rotary circular die according to claim 2, wherein the depth of said slant tapered groove is decreased from said lower part to said upper part of said semi-spherical surface.

5. A multi-core rotary circular die according to claim 2, wherein said slant tapered groove is formed on the outer surface of said middle cores.

6. A multi-core rotary circular die according to claim 2, wherein said slant tapered groove is formed on an inner semi-spherical surface of said circular die.

7. A multi-core rotary circular die according to claim 1, wherein said plurality of middle cores are unitary.

8. A multi-core rotary circular die according to claim 1, wherein said middle core fastened on one end of the inner cores is connected to the circular die by bolts.

9. A multi-core rotary circular die according to claim 1 further comprising at least one utility feeding passage formed in the inner core extending in the longitudinal direction thereof.

10. A multi-core rotary circular die according to claim 1, further comprising sealing means between said inner core and said cylindrical body disposed longitudinally therealong on both sides of each of said annular resin storage channels.

11. A multi-core rotary circular die according to claim 9, further comprising an electric wire connected to a slip ring disposed in said at least one utility feeding passage.

12. A multi-core rotary circular die according to claim 9, wherein said annular resin storage channels are connected through said corresponding resin passages of said inner core and spaces of said at least semi-spherical parts and cylindrical parts to a die lip.

13. A multi-core rotary circular die according to claim 9, wherein said at least semi-spherical surfaces of said middle cores are spherical surfaces.

* * * * *